(No Model.)

R. QUINN.
TOOL FOR CUTTING TAPERING OPENINGS.

No. 489,265. Patented Jan. 3, 1893.

WITNESSES:
P. F. Eagle.
L. Douville.

INVENTOR
Roger Quinn
BY John A. Wiedersheim
ATTORNEY.

UNITED STATES PATENT OFFICE.

ROGER QUINN, OF PHILADELPHIA, PENNSYLVANIA.

TOOL FOR CUTTING TAPERING OPENINGS.

SPECIFICATION forming part of Letters Patent No. 489,265, dated January 3, 1893.

Application filed April 4, 1892. Serial No. 427,609. (No model.)

*To all whom it may concern:*

Be it known that I, ROGER QUINN, a citizen of the United States, residing in the city and county of Philadelphia, State of Pennsylvania, have invented a new and useful Improvement in Tools for Cutting Tapering Openings, which improvement is fully set forth in the following specification and accompanying drawings.

My invention consists of a tool for cutting tapering openings, formed as hereinafter set forth and claimed.

Figure 1:
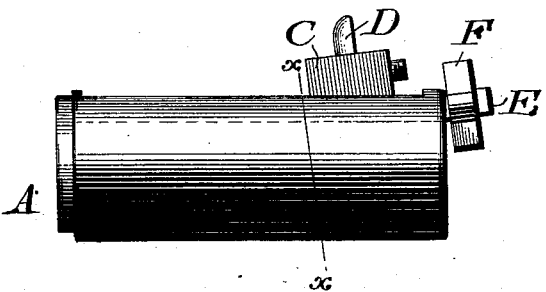
Figure 2:
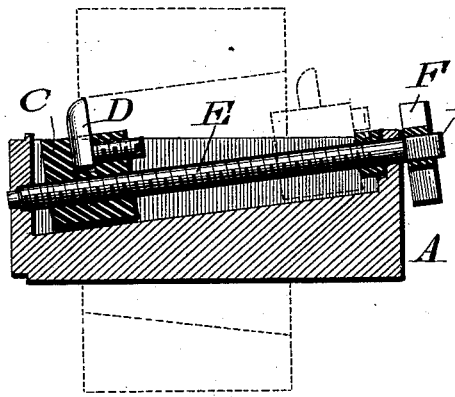
Figure 3:
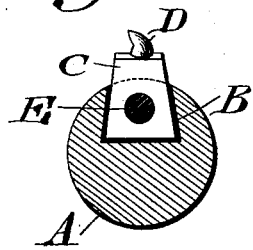
Figure 4:
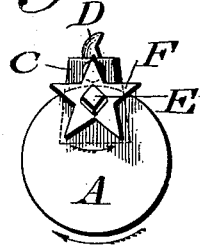

Figure 1 represents a side elevation of a tool embodying my invention. Fig. 2 represents a longitudinal section thereof. Fig. 3 represents a transverse section thereof. Fig. 4 represents an end view thereof.

Similar letters of reference indicate corresponding parts in the several figures.

Referring to the drawings:—A designates a head which is mounted on a suitable part of a lathe, and adapted to be rotated thereon. In said head is a longitudinally extending recess B, in which is located a traveler C, to which is secured a cutter D, said traveler being fitted on a rotatable screw E, which is journaled on the end walls of the recess D, and extends obliquely through the head, as most clearly shown in Fig. 2, the bottom of said recess being inclined and substantially parallel with said screw. On the end of the screw is a toothed wheel F, which is adapted to be engaged by a suitable tappet or projection on the lathe, so that on every revolution of the head, the screw is caused to rotate on its axis independently of said head, whereby motion is gradually imparted to the traveler toward one end of the head, so that the sweep of the cutter D is gradually increased or decreased as the case may be, it being seen that when the head is inserted in the opening of a piece of metal cored or otherwise, and properly rotated, and the screw D is likewise operated, if the traveler is advancing say to the right, the cutter is gradually moved out from the periphery of the head, so that its circle of motion gradually increases, and it accordingly cuts the wall of the opening in tapering form beginning at the narrow end of the taper. Should the traveler advance to the left, the circle described by the cutter gradually decreases as it is carried toward the periphery of the head, its action however being to cut the wall in tapering form, as in the previous case, excepting that the work begins at the wide end. The sides of the recess D, and of the traveler C, are inclined after the manner of a dovetailed joint, whereby lateral strain of the traveler on the screw is relieved, and said traveler is prevented from being improperly drawn out of the recess when the tool is in operation. More than one cutter may be employed if so desired. It will be noticed that when the tool or bit of the traveler bears against the bore of the metal it is subjected to strain, and thus it is liable to be forced backward, and as it may turn on the bottom of the passage as a fulcrum, it may be wrenched outwardly and strain the screw, but the sides of said passage, owing to their dovetail nature, overhang those of the traveler, and thus resist said outward strain on the traveler and screw, the effect of which is evident.

Having thus described my invention, what I claim as new, and desire to secure by Letters Patent, is:—

The herein described tool for cutting tapering openings consisting of a head adapted to be mounted and rotated on a lathe, and having a longitudinally-extending recess therein with inclined bottom and side walls, as described, a rotatable screw journaled in the end walls of said recess, said screw being inclined to said walls and substantially parallel with the bottom of said recess, a traveler on said screw, and a cutter secured on said traveler, said traveler having inclined side walls and fitting closely in said recess, said parts being combined substantially as described.

ROGER QUINN.

Witnesses:
JOHN A. WIEDERSHEIM,
R. H. GRAESER.